US011581725B2

(12) United States Patent
Telefus

(10) Patent No.: US 11,581,725 B2
(45) Date of Patent: Feb. 14, 2023

(54) SOLID-STATE POWER INTERRUPTERS

(71) Applicant: Intelesol, LLC, Danville, CA (US)

(72) Inventor: Mark Telefus, Orinda, CA (US)

(73) Assignee: Intelesol, LLC, Danville, CA (US)

( * ) Notice: Subject to any disclaimer, the term of this patent is extended or adjusted under 35 U.S.C. 154(b) by 0 days.

(21) Appl. No.: 17/115,753

(22) Filed: Dec. 8, 2020

(65) Prior Publication Data

US 2021/0119528 A1 Apr. 22, 2021

Related U.S. Application Data

(63) Continuation-in-part of application No. 16/029,549, filed on Jul. 7, 2018, now abandoned.

(51) Int. Cl.
*H02H 3/08* (2006.01)
*H02M 1/08* (2006.01)
*H02H 1/06* (2006.01)

(52) U.S. Cl.
CPC ............... *H02H 3/08* (2013.01); *H02H 1/06* (2013.01); *H02M 1/08* (2013.01)

(58) Field of Classification Search
CPC .................................... H02H 3/08; H02H 1/06
See application file for complete search history.

(56) References Cited

U.S. PATENT DOCUMENTS

| 3,638,102 | A | 1/1972 | Pelka |
| 3,777,253 | A | 12/1973 | Callan |
| 4,074,345 | A | 2/1978 | Ackermann |

(Continued)

FOREIGN PATENT DOCUMENTS

| CN | 109075551 B | 1/2021 |
| DE | 19712261 A1 | 10/1998 |

(Continued)

OTHER PUBLICATIONS

L. Shengyuan et al., "Instantaneous Value Sampling AC-DC Converter and its Application in Power Quantity Detection," 2011 Third International Conference on Measuring Technology and Mechatronics Automation, Jan. 6-7, 2011, 4 pages.

(Continued)

*Primary Examiner* — Peter M Novak
(74) *Attorney, Agent, or Firm* — Ryan, Mason & Lewis, LLP

(57) ABSTRACT

A power interrupter device includes a solid-state bidirectional switch and control circuitry to control the solid-state bidirectional switch. The bidirectional switch is connected between input and output terminals of the power interrupter device. The control circuitry includes driver circuitry and fault detection circuitry. The driver circuitry generates a regulated direct current (DC) voltage using current drawn from an input power source applied to the input terminal and applies the regulated DC voltage to a control input of the bidirectional switch. The fault detection circuitry is configured to sense a level of load current flowing in an electrical path between the input and output terminals, to detect an occurrence of a fault condition based on the sensed load current level, and to short the control input of the bidirectional switch to place the bidirectional switch in a switched-off state, in response to detecting the occurrence of a fault condition.

20 Claims, 6 Drawing Sheets

(56) References Cited

U.S. PATENT DOCUMENTS

| | | |
|---|---|---|
| 4,127,895 A | 11/1978 | Krueger |
| 4,245,148 A | 1/1981 | Gisske et al. |
| 4,245,184 A | 1/1981 | Billings et al. |
| 4,245,185 A | 1/1981 | Mitchell et al. |
| 4,257,081 A | 3/1981 | Sauer et al. |
| 4,466,071 A | 8/1984 | Russell, Jr. |
| 4,487,458 A | 12/1984 | Janutka |
| 4,581,540 A | 4/1986 | Guajardo |
| 4,631,625 A | 12/1986 | Alexander et al. |
| 4,636,907 A | 1/1987 | Howell |
| 4,649,302 A | 3/1987 | Damiano et al. |
| 4,653,084 A | 3/1987 | Ahuja |
| 4,682,061 A | 7/1987 | Donovan |
| 4,685,046 A | 8/1987 | Sanders |
| 4,709,296 A | 11/1987 | Hung et al. |
| 4,760,293 A | 7/1988 | Hebenstreit |
| 4,766,281 A | 8/1988 | Buhler |
| 4,812,995 A | 3/1989 | Girgis et al. |
| 4,888,504 A | 12/1989 | Kinzer |
| 5,121,282 A | 6/1992 | White |
| 5,276,737 A | 1/1994 | Micali |
| 5,307,257 A | 4/1994 | Fukushima |
| 5,371,646 A | 12/1994 | Biegelmeier |
| 5,410,745 A | 4/1995 | Friesen et al. |
| 5,559,656 A | 9/1996 | Chokhawala |
| 5,646,514 A | 7/1997 | Tsunetsugu |
| 5,654,880 A | 8/1997 | Brkovic et al. |
| 5,731,732 A | 3/1998 | Williams |
| 5,793,596 A | 8/1998 | Jordan et al. |
| 5,796,274 A | 8/1998 | Willis et al. |
| 5,859,756 A * | 1/1999 | Pressman ............... H02H 3/207 |
| | | 361/18 |
| 5,870,009 A | 2/1999 | Serpinet et al. |
| 5,933,305 A | 8/1999 | Schmalz et al. |
| 6,081,123 A | 6/2000 | Kasbarian et al. |
| 6,111,494 A | 8/2000 | Fischer et al. |
| 6,115,267 A | 9/2000 | Herbert |
| 6,141,197 A | 10/2000 | Kim et al. |
| 6,160,689 A | 12/2000 | Stolzenberg |
| 6,167,329 A | 12/2000 | Engel et al. |
| 6,169,391 B1 | 1/2001 | Lei |
| 6,188,203 B1 | 2/2001 | Rice et al. |
| 6,300,748 B1 | 10/2001 | Miller |
| 6,369,554 B1 | 4/2002 | Aram |
| 6,483,290 B1 | 11/2002 | Hemminger et al. |
| 6,515,434 B1 | 2/2003 | Biebl |
| 6,538,906 B1 | 3/2003 | Ke et al. |
| 6,756,998 B1 | 6/2004 | Bilger |
| 6,788,512 B2 | 9/2004 | Vicente et al. |
| 6,813,720 B2 | 11/2004 | Leblanc |
| 6,839,208 B2 | 1/2005 | Macbeth et al. |
| 6,843,680 B2 | 1/2005 | Gorman |
| 6,906,476 B1 | 6/2005 | Beatenbough et al. |
| 6,984,988 B2 | 1/2006 | Yamamoto |
| 7,045,723 B1 | 5/2006 | Projkovski |
| 7,053,626 B2 | 5/2006 | Monter et al. |
| 7,110,225 B1 | 9/2006 | Hick |
| 7,164,238 B2 | 1/2007 | Kazanov et al. |
| 7,292,419 B1 * | 11/2007 | Nemir .................. H02H 5/105 |
| | | 361/42 |
| 7,297,603 B2 | 11/2007 | Robb et al. |
| 7,304,828 B1 | 12/2007 | Shvartsman |
| D558,683 S | 1/2008 | Pape et al. |
| 7,319,574 B2 | 1/2008 | Engel |
| D568,253 S | 5/2008 | Gorman |
| 7,367,121 B1 | 5/2008 | Gorman |
| 7,586,285 B2 | 9/2009 | Gunji |
| 7,595,680 B2 | 9/2009 | Morita et al. |
| 7,610,616 B2 | 10/2009 | Masuouka et al. |
| 7,633,727 B2 | 12/2009 | Zhou et al. |
| 7,643,256 B2 | 1/2010 | Wright et al. |
| 7,693,670 B2 | 4/2010 | Durling et al. |
| 7,715,216 B2 | 5/2010 | Liu et al. |
| 7,729,147 B1 | 6/2010 | Wong et al. |
| 7,731,403 B2 | 6/2010 | Lynam et al. |
| 7,746,677 B2 | 6/2010 | Unkrich |
| 7,821,023 B2 | 10/2010 | Yuan et al. |
| D638,355 S | 5/2011 | Chen |
| 7,936,279 B2 | 5/2011 | Tang et al. |
| 7,948,719 B2 | 5/2011 | Xu |
| 8,124,888 B2 | 2/2012 | Etemad-Moghadam et al. |
| 8,256,675 B2 | 9/2012 | Baglin et al. |
| 8,374,729 B2 | 2/2013 | Chapel et al. |
| 8,463,453 B2 | 6/2013 | Parsons, Jr. |
| 8,482,885 B2 | 7/2013 | Billingsley et al. |
| 8,560,134 B1 | 10/2013 | Lee |
| 8,649,883 B2 | 2/2014 | Lu et al. |
| 8,664,886 B2 | 3/2014 | Ostrovsky |
| 8,717,720 B2 | 5/2014 | DeBoer |
| 8,718,830 B2 | 5/2014 | Smith |
| 8,781,637 B2 | 7/2014 | Eaves |
| 8,817,441 B2 | 8/2014 | Callanan |
| 8,890,371 B2 | 11/2014 | Gotou |
| D720,295 S | 12/2014 | Dodal et al. |
| 8,947,838 B2 | 2/2015 | Yamai et al. |
| 9,054,587 B2 | 6/2015 | Neyman |
| 9,055,641 B2 | 6/2015 | Shteynberg et al. |
| 9,287,792 B2 | 3/2016 | Telefus et al. |
| 9,325,516 B2 | 4/2016 | Pera et al. |
| 9,366,702 B2 | 6/2016 | Steele et al. |
| 9,439,318 B2 | 9/2016 | Chen |
| 9,443,845 B1 | 9/2016 | Stafanov et al. |
| 9,502,832 B1 | 11/2016 | Ullahkhan et al. |
| 9,509,083 B2 | 11/2016 | Yang |
| 9,515,560 B1 | 12/2016 | Telefus et al. |
| 9,577,420 B2 | 2/2017 | Ostrovsky et al. |
| 9,621,053 B1 | 4/2017 | Telefus |
| 9,755,630 B2 * | 9/2017 | Urciuoli ................. H02M 1/32 |
| 9,774,182 B2 | 9/2017 | Phillips |
| 9,836,243 B1 | 12/2017 | Chanler et al. |
| D814,424 S | 4/2018 | DeCosta |
| 9,965,007 B2 | 5/2018 | Amelio et al. |
| 9,990,786 B1 | 6/2018 | Ziraknejad |
| 9,991,633 B2 | 6/2018 | Robinet |
| 10,072,942 B2 | 9/2018 | Wootton et al. |
| 10,101,716 B2 | 10/2018 | Kim |
| 10,187,944 B2 | 1/2019 | MacAdam et al. |
| 10,469,077 B2 | 11/2019 | Telefus et al. |
| D879,056 S | 3/2020 | Telefus |
| D881,144 S | 4/2020 | Telefus |
| 10,615,713 B2 | 4/2020 | Telefus et al. |
| 10,645,536 B1 | 5/2020 | Barnes et al. |
| 10,756,662 B2 | 8/2020 | Steiner et al. |
| 10,812,072 B2 | 10/2020 | Telefus et al. |
| 10,812,282 B2 | 10/2020 | Telefus et al. |
| 10,819,336 B2 | 10/2020 | Telefus et al. |
| 10,834,792 B2 | 11/2020 | Telefus et al. |
| 10,887,447 B2 | 1/2021 | Jakobsson et al. |
| 10,936,749 B2 | 3/2021 | Jakobsson |
| 10,951,435 B2 | 3/2021 | Jakobsson |
| 10,985,548 B2 | 4/2021 | Telefus |
| 10,992,236 B2 | 4/2021 | Telefus et al. |
| 10,993,082 B2 | 4/2021 | Jakobsson |
| 2002/0109487 A1 | 8/2002 | Telefus et al. |
| 2003/0052544 A1 | 3/2003 | Yamamoto et al. |
| 2003/0063420 A1 | 4/2003 | Pahl et al. |
| 2003/0151865 A1 | 8/2003 | Maio |
| 2004/0032756 A1 | 2/2004 | Van Den Bossche |
| 2004/0251884 A1 | 12/2004 | Steffie et al. |
| 2005/0128657 A1 * | 6/2005 | Covault ................ H02H 3/087 |
| | | 361/18 |
| 2005/0162139 A1 | 7/2005 | Hirst |
| 2005/0185353 A1 | 8/2005 | Rasmussen et al. |
| 2005/0286184 A1 | 12/2005 | Campolo |
| 2006/0285366 A1 | 12/2006 | Radecker et al. |
| 2007/0008747 A1 | 1/2007 | Soldano et al. |
| 2007/0143826 A1 | 6/2007 | Sastry et al. |
| 2007/0159745 A1 | 7/2007 | Berberich et al. |
| 2007/0188025 A1 | 8/2007 | Keagy et al. |
| 2007/0236152 A1 | 10/2007 | Davis et al. |
| 2008/0006607 A1 | 1/2008 | Boeder et al. |
| 2008/0136581 A1 | 6/2008 | Heilman et al. |
| 2008/0151444 A1 | 6/2008 | Upton |
| 2008/0174922 A1 | 7/2008 | Kimbrough |

(56) References Cited

U.S. PATENT DOCUMENTS

| | | |
|---|---|---|
| 2008/0180866 A1 | 7/2008 | Wong |
| 2008/0197699 A1* | 8/2008 | Yu .................. H02H 9/041 307/131 |
| 2008/0204950 A1 | 8/2008 | Zhou et al. |
| 2008/0253153 A1 | 10/2008 | Wu et al. |
| 2008/0281472 A1 | 11/2008 | Podgorny et al. |
| 2009/0034139 A1 | 2/2009 | Martin |
| 2009/0067201 A1 | 3/2009 | Cai |
| 2009/0168273 A1 | 7/2009 | Yu et al. |
| 2009/0195349 A1 | 8/2009 | Frader-Thompson et al. |
| 2009/0203355 A1 | 8/2009 | Clark |
| 2009/0213629 A1 | 8/2009 | Liu et al. |
| 2009/0284385 A1 | 11/2009 | Tang et al. |
| 2010/0091418 A1 | 4/2010 | Xu |
| 2010/0145479 A1 | 6/2010 | Griffiths |
| 2010/0145542 A1 | 6/2010 | Chapel et al. |
| 2010/0156369 A1 | 6/2010 | Kularatna et al. |
| 2010/0188054 A1 | 7/2010 | Asakura et al. |
| 2010/0231135 A1 | 9/2010 | Hum et al. |
| 2010/0231373 A1 | 9/2010 | Romp |
| 2010/0244730 A1 | 9/2010 | Nerone |
| 2010/0261373 A1 | 10/2010 | Roneker |
| 2010/0284207 A1 | 11/2010 | Watanabe et al. |
| 2010/0296207 A1 | 11/2010 | Schumacher et al. |
| 2010/0320840 A1 | 12/2010 | Fridberg |
| 2011/0062936 A1 | 3/2011 | Bartelous |
| 2011/0121752 A1 | 5/2011 | Newman, Jr. et al. |
| 2011/0127922 A1 | 6/2011 | Sauerlaender |
| 2011/0156610 A1 | 6/2011 | Ostrovsky et al. |
| 2011/0273103 A1 | 11/2011 | Hong |
| 2011/0292703 A1 | 12/2011 | Cuk |
| 2011/0299547 A1 | 12/2011 | Diab et al. |
| 2011/0301894 A1 | 12/2011 | Sanderford, Jr. |
| 2011/0305054 A1 | 12/2011 | Yamagiwa et al. |
| 2011/0307447 A1 | 12/2011 | Sabaa et al. |
| 2012/0026632 A1 | 2/2012 | Acharya et al. |
| 2012/0075897 A1 | 3/2012 | Fujita |
| 2012/0089266 A1 | 4/2012 | Tomimbang et al. |
| 2012/0095605 A1 | 4/2012 | Tran |
| 2012/0133289 A1 | 5/2012 | Hum et al. |
| 2012/0275076 A1 | 11/2012 | Shono |
| 2012/0311035 A1 | 12/2012 | Guha et al. |
| 2013/0051102 A1 | 2/2013 | Huang et al. |
| 2013/0057247 A1 | 3/2013 | Russell et al. |
| 2013/0063851 A1 | 3/2013 | Stevens et al. |
| 2013/0066478 A1 | 3/2013 | Smith |
| 2013/0088160 A1 | 4/2013 | Chai et al. |
| 2013/0119958 A1 | 5/2013 | Gasperi |
| 2013/0128396 A1 | 5/2013 | Danesh et al. |
| 2013/0170261 A1 | 7/2013 | Lee et al. |
| 2013/0174211 A1 | 7/2013 | Aad et al. |
| 2013/0245841 A1 | 9/2013 | Ahn et al. |
| 2013/0253898 A1 | 9/2013 | Meagher et al. |
| 2013/0261821 A1 | 10/2013 | Lu et al. |
| 2013/0300534 A1 | 11/2013 | Myllymaki |
| 2013/0329331 A1 | 12/2013 | Erger et al. |
| 2014/0043732 A1 | 2/2014 | McKay et al. |
| 2014/0067137 A1 | 3/2014 | Amelio et al. |
| 2014/0074730 A1 | 3/2014 | Arensmeier et al. |
| 2014/0085940 A1 | 3/2014 | Lee et al. |
| 2014/0096272 A1 | 4/2014 | Makofsky et al. |
| 2014/0097809 A1 | 4/2014 | Follic et al. |
| 2014/0159593 A1 | 6/2014 | Chu et al. |
| 2014/0203718 A1 | 7/2014 | Yoon et al. |
| 2014/0246926 A1 | 9/2014 | Cruz et al. |
| 2014/0266698 A1 | 9/2014 | Hall et al. |
| 2014/0268935 A1 | 9/2014 | Chiang |
| 2014/0276753 A1 | 9/2014 | Wham et al. |
| 2015/0042274 A1 | 2/2015 | Kim et al. |
| 2015/0055261 A1 | 2/2015 | Lubick et al. |
| 2015/0097430 A1 | 4/2015 | Scruggs |
| 2015/0116886 A1 | 4/2015 | Zehnder et al. |
| 2015/0154404 A1 | 6/2015 | Patel et al. |
| 2015/0155789 A1 | 6/2015 | Freeman et al. |
| 2015/0180469 A1 | 6/2015 | Kim |
| 2015/0185261 A1 | 7/2015 | Frader-Thompson et al. |
| 2015/0216006 A1 | 7/2015 | Lee et al. |
| 2015/0236587 A1 | 8/2015 | Kim et al. |
| 2015/0253364 A1 | 9/2015 | Hieda et al. |
| 2015/0256355 A1 | 9/2015 | Pera et al. |
| 2015/0256665 A1 | 9/2015 | Pera et al. |
| 2015/0282223 A1 | 10/2015 | Wang et al. |
| 2015/0309521 A1 | 10/2015 | Pan |
| 2015/0317326 A1 | 11/2015 | Bandarupalli et al. |
| 2015/0355649 A1 | 12/2015 | Ovadia |
| 2015/0362927 A1 | 12/2015 | Giorgi |
| 2016/0012699 A1 | 1/2016 | Lundy |
| 2016/0018800 A1 | 1/2016 | Gettings et al. |
| 2016/0035159 A1 | 2/2016 | Ganapathy Achari et al. |
| 2016/0057841 A1 | 2/2016 | Lenig |
| 2016/0069933 A1 | 3/2016 | Cook et al. |
| 2016/0077746 A1 | 3/2016 | Muth et al. |
| 2016/0081143 A1 | 3/2016 | Wang |
| 2016/0110154 A1 | 4/2016 | Qureshi et al. |
| 2016/0117917 A1 | 4/2016 | Prakash et al. |
| 2016/0126031 A1 | 5/2016 | Wootton et al. |
| 2016/0178691 A1 | 6/2016 | Simonin |
| 2016/0181941 A1 | 6/2016 | Gratton et al. |
| 2016/0195864 A1 | 7/2016 | Kim |
| 2016/0247799 A1 | 8/2016 | Stafanov et al. |
| 2016/0259308 A1 | 9/2016 | Fadell et al. |
| 2016/0260135 A1 | 9/2016 | Zomet et al. |
| 2016/0277528 A1 | 9/2016 | Guilaume et al. |
| 2016/0294179 A1 | 10/2016 | Kennedy et al. |
| 2016/0343083 A1 | 11/2016 | Hering et al. |
| 2016/0360586 A1 | 12/2016 | Yang et al. |
| 2016/0374134 A1 | 12/2016 | Kweon et al. |
| 2017/0004948 A1 | 1/2017 | Leyh |
| 2017/0019969 A1 | 1/2017 | O'Neil et al. |
| 2017/0026194 A1 | 1/2017 | Vijayrao et al. |
| 2017/0033942 A1 | 2/2017 | Koeninger |
| 2017/0063225 A1 | 3/2017 | Guo et al. |
| 2017/0086281 A1 | 3/2017 | Avrahamy |
| 2017/0099647 A1 | 4/2017 | Shah et al. |
| 2017/0170730 A1 | 6/2017 | Sugiura |
| 2017/0171802 A1 | 6/2017 | Hou et al. |
| 2017/0179946 A1 | 6/2017 | Turvey |
| 2017/0195130 A1 | 7/2017 | Landow et al. |
| 2017/0212653 A1 | 7/2017 | Kanojia et al. |
| 2017/0230193 A1 | 8/2017 | Apte et al. |
| 2017/0244241 A1 | 8/2017 | Wilson et al. |
| 2017/0256934 A1 | 9/2017 | Kennedy et al. |
| 2017/0256941 A1 | 9/2017 | Bowers et al. |
| 2017/0256956 A1 | 9/2017 | Irish et al. |
| 2017/0277709 A1 | 9/2017 | Strauss et al. |
| 2017/0314743 A1 | 11/2017 | Del Castillo et al. |
| 2017/0322049 A1 | 11/2017 | Wootton et al. |
| 2017/0322258 A1 | 11/2017 | Miller et al. |
| 2017/0338809 A1 | 11/2017 | Stefanov et al. |
| 2017/0347415 A1 | 11/2017 | Cho et al. |
| 2017/0366950 A1 | 12/2017 | Arbon |
| 2018/0026534 A1 | 1/2018 | Turcan |
| 2018/0054862 A1 | 2/2018 | Takagimoto et al. |
| 2018/0061158 A1 | 3/2018 | Greene |
| 2018/0146369 A1 | 5/2018 | Kennedy, Jr. |
| 2018/0174076 A1 | 6/2018 | Fukami |
| 2018/0196094 A1 | 7/2018 | Fishburn et al. |
| 2018/0201302 A1 | 7/2018 | Sonoda et al. |
| 2018/0254959 A1 | 9/2018 | Mantyjarvi et al. |
| 2018/0285198 A1 | 10/2018 | Dantkale et al. |
| 2018/0287802 A1 | 10/2018 | Brickell |
| 2018/0301006 A1 | 10/2018 | Flint et al. |
| 2018/0307609 A1 | 10/2018 | Qiang et al. |
| 2018/0342329 A1 | 11/2018 | Rufo et al. |
| 2018/0359039 A1 | 12/2018 | Daoura et al. |
| 2018/0359223 A1 | 12/2018 | Maier et al. |
| 2019/0003855 A1 | 1/2019 | Wootton et al. |
| 2019/0020477 A1 | 1/2019 | Antonatos et al. |
| 2019/0028869 A1 | 1/2019 | Kaliner |
| 2019/0036928 A1 | 1/2019 | Meriac et al. |
| 2019/0050903 A1 | 2/2019 | DeWitt et al. |
| 2019/0052174 A1 | 2/2019 | Gong |
| 2019/0068716 A1 | 2/2019 | Lauer |
| 2019/0086979 A1 | 3/2019 | Kao et al. |

(56) References Cited

U.S. PATENT DOCUMENTS

| | | |
|---|---|---|
| 2019/0087835 A1 | 3/2019 | Schwed et al. |
| 2019/0104138 A1 | 4/2019 | Storms et al. |
| 2019/0122834 A1 | 4/2019 | Wootton et al. |
| 2019/0140640 A1 | 5/2019 | Telefus et al. |
| 2019/0165691 A1 | 5/2019 | Telefus et al. |
| 2019/0207375 A1 | 7/2019 | Telefus et al. |
| 2019/0238060 A1 | 8/2019 | Telefus et al. |
| 2019/0245457 A1 | 8/2019 | Telefus et al. |
| 2019/0253243 A1 | 8/2019 | Zimmerman et al. |
| 2019/0268176 A1 | 8/2019 | Pognant |
| 2019/0280887 A1 | 9/2019 | Telefus et al. |
| 2019/0306953 A1 | 10/2019 | Joyce et al. |
| 2019/0334999 A1 | 10/2019 | Ryhorchuk et al. |
| 2019/0355014 A1 | 11/2019 | Gerber |
| 2019/0372331 A1 | 12/2019 | Liu et al. |
| 2020/0007126 A1 | 1/2020 | Telefus et al. |
| 2020/0014301 A1 | 1/2020 | Telefus |
| 2020/0014379 A1 | 1/2020 | Telefus |
| 2020/0044883 A1 | 2/2020 | Telefus et al. |
| 2020/0052607 A1 | 2/2020 | Telefus et al. |
| 2020/0053100 A1 | 2/2020 | Jakobsson |
| 2020/0106259 A1 | 4/2020 | Telefus |
| 2020/0106260 A1 | 4/2020 | Telefus |
| 2020/0106637 A1 | 4/2020 | Jakobsson |
| 2020/0120202 A1 | 4/2020 | Jakobsson et al. |
| 2020/0145247 A1 | 5/2020 | Jakobsson |
| 2020/0153245 A1 | 5/2020 | Jakobsson et al. |
| 2020/0159960 A1 | 5/2020 | Jakobsson |
| 2020/0193785 A1 | 6/2020 | Berglund et al. |
| 2020/0196110 A1 | 6/2020 | Jakobsson |
| 2020/0196412 A1 | 6/2020 | Telefus et al. |
| 2020/0260287 A1 | 8/2020 | Hendel |
| 2020/0275266 A1 | 8/2020 | Jakobsson |
| 2020/0287537 A1 | 9/2020 | Telefus et al. |
| 2020/0314233 A1 | 10/2020 | Mohalik et al. |
| 2020/0328694 A1 | 10/2020 | Telefus et al. |
| 2020/0344596 A1 | 10/2020 | Dong et al. |
| 2020/0365345 A1 | 11/2020 | Telefus et al. |
| 2020/0365346 A1 | 11/2020 | Telefus et al. |
| 2020/0365356 A1 | 11/2020 | Telefus et al. |
| 2020/0366078 A1 | 11/2020 | Telefus et al. |
| 2020/0366079 A1 | 11/2020 | Telefus et al. |
| 2020/0394332 A1 | 12/2020 | Jakobsson et al. |
| 2021/0014947 A1 | 1/2021 | Telefus et al. |
| 2021/0119528 A1 | 4/2021 | Telefus |

FOREIGN PATENT DOCUMENTS

| | | |
|---|---|---|
| EP | 0016646 A1 | 10/1980 |
| EP | 0398026 A2 | 11/1990 |
| EP | 2560063 A1 | 2/2013 |
| GB | 1302357 A | 1/1973 |
| GB | 2458699 A | 9/2009 |
| JP | 06-053779 A | 2/1994 |
| JP | 2012244716 A * | 12/2012 |
| JP | 2013230034 A | 11/2013 |
| JP | 2014030355 A | 2/2014 |
| WO | 2010110951 A1 | 9/2010 |
| WO | 2016010529 A1 | 1/2016 |
| WO | 2016105505 A1 | 6/2016 |
| WO | 2016110833 A2 | 7/2016 |
| WO | 2017196571 A1 | 11/2017 |
| WO | 2017196572 A1 | 11/2017 |
| WO | 2017196649 A1 | 11/2017 |
| WO | 2018075726 A1 | 4/2018 |
| WO | 2018080604 A1 | 5/2018 |
| WO | 2018080614 A1 | 5/2018 |
| WO | 2018081619 A2 | 5/2018 |
| WO | 2018081619 A3 | 5/2018 |
| WO | 2019133110 A1 | 7/2019 |
| WO | 2020014158 A1 | 1/2020 |
| WO | 2020014161 A1 | 1/2020 |
| WO | PCT/US19/54102 | 2/2020 |
| WO | 2020072516 A1 | 4/2020 |
| WO | PCT/US19/67004 | 4/2020 |
| WO | 2020131977 A1 | 6/2020 |
| WO | PCT/US20/33421 | 9/2020 |
| WO | 2020236726 A1 | 11/2020 |
| WO | PCT/US21/14320 | 4/2021 |

OTHER PUBLICATIONS

H.-H. Chang et al., "Load Recognition for Different Loads with the Same Real Power and Reactive Power in a Non-intrusive Load-monitoring System," 2008 12th International Conference on Computer Supported Cooperative Work in Design, Apr. 16-18, 2008, 6 pages.

F. Stajano et al., "The Resurrecting Duckling: Security Issues for Ad-hoc Wireless Networks," International Workshop on Security Protocols, 1999, 11 pages.

L. Sweeney, "Simple Demographics Often Identify People Uniquely," Carnegie Mellon University, Data Privacy Working Paper 3, 2000, 34 pages.

A. Narayanan et al., "Robust De-anonymization of Large Sparse Datasets," IEEE Symposium on Security and Privacy, May 2008, 15 pages.

M. Alahmad et al., "Non-lntrusive Electrical Load Monitoring and Profiling Methods for Applications in Energy Management Systems," IEEE Long Island Systems, Applications and Technology Conference, 2011, 7 pages.

K. Yang et al. "Series Arc Fault Detection Algorithm Based on Autoregressive Bispecturm Analysis," Algorithms, vol. 8, Oct. 16, 2015, pp. 929-950.

J.-E. Park et al., "Design on Topologies for High Efficiency Two-Stage AC-DC Converter," 2012 IEEE 7th International Power Electronics and Motion Control Conference—ECCE Asia, Jun. 2-5, 2012, China, 6 pages.

S. Cuk, "98% Efficient Single-Stage AC/DC Converter Topologies," Power Electronics Europe, Issue 4, 2011, 6 pages.

E. Carvou et al., "Electrical Arc Characterization for Ac-Arc Fault Applications," 2009 Proceedings of the 55th IEEE Holm Conference on Electrical Contacts, IEEE Explore Oct. 9, 2009, 6 pages.

C. Restrepo, "Arc Fault Detection and Discrimination Methods," 2007 Proceedings of the 53rd IEEE Holm Conference on Electrical Contacts, IEEE Explore Sep. 24, 2007, 8 pages.

K. Eguchi et al., "Design of a Charge-Pump Type AC-DC Converter for RF-ID Tags," 2006 International Symposium on Communications and Information Technologies, F4D-3, IEEE, 2006, 4 pages.

A. Ayari et al., "Active Power Measurement Comparison Between Analog and Digital Methods," International Conference on Electrical Engineering and Software Applications, 2013, 6 pages.

G. D. Gregory et al., "The Arc-Fault Circuit Interrupter, an Emerging Product," IEEE, 1998, 8 pages.

D. Irwin et al., "Exploiting Home Automation Protocols for Load Monitoring in Smart Buildings," BuildSys '11: Proceedings of the Third ACM Workshop on Embedded Sensing Systems for Energy-Efficiency in Buildings, Nov. 2011, 6 pages.

B. Mrazovac et al., "Towards Ubiquitous Smart Outlets for Safety and Energetic Efficiency of Home Electric Appliances," 2011 IEEE International Conference on Consumer Electronics, Berlin, German, Sep. 6-8, 2011, 5 pages.

J. K. Becker et al., "Tracking Anonymized Bluetooth Devices," Proceedings on Privacy Enhancing Technologies, vol. 3, 2019, pp. 50-65.

H. Siadati et al., "Mind your SMSes: Mitigating Social Engineering in Second Factor Authentication," Computers & Security, vol. 65, Mar. 2017, 12 pages.

S. Jerde, "The New York Times Can Now Predict Your Emotions and Motivations After Reading a Story," https://www.adweek.com/tv-video/the-new-york-times-can-now-predict-your-emotions-and-motivations-after-reading-a-story/, Apr. 29, 2019, 3 pages.

K. Mowery et al., "Pixel Perfect: Fingerprinting Canvas in HTML5," Proceedings of W2SP, 2012, 12 pages.

S. Kamkar, "Evercookie," https://samy.pl/evercookie/, Oct. 11, 2010, 5 pages.

M. K. Franklin et al., "Fair Exchange with a Semi-Trusted Third Party," Association for Computing Machinery, 1997, 6 pages.

(56) References Cited

OTHER PUBLICATIONS

J. Camenisch et al., "Digital Payment Systems with Passive Anonymity-Revoking Trustees," Journal of Computer Security, vol. 5, No. 1, 1997, 11 pages.
L. Coney et al., "Towards a Privacy Measurement Criterion for Voting Systems," Proceedings of the 2005 National Conference on Digital Government Research, 2005, 2 pages.
L. Sweeney, "k-anonymity: A Model for Protecting Privacy," International Journal of Uncertainty, Fuzziness and Knowledge-Based Systems, vol. 1, No. 5, 2002, 14 pages.
C. Dwork, "Differential Privacy," Encyclopedia of Cryptography and Security, 2011, 12 pages.
A. P. Felt et al., "Android Permissions: User Attention, Comprehension, and Behavior," Symposium on Usable Privacy and Security, Jul. 11-13, 2012, 14 pages.
S. Von Solms et al., "On Blind Signatures and Perfect Crimes," Computers & Security, vol. 11, No. 6, 1992, 3 pages.
R. Wyden, "Wyden Releases Discussion Draft of Legislation to Provide Real Protections for Americans' Privacy," https://www.wyden.senate.gov/news/press-releases/wyden-releases-discussion-draft-of-legislation-to-provide-real-protections-for-americans-privacy, Nov. 1, 2018, 3 pages.
M. Rubio, "Rubio Introduces Privacy Bill to Protect Consumers While Promoting Innovation," https://www.rubio.senate.gov/public/index.cfm/2019/1/rubio-introduces-privacy-bill-to-protect-consumers-while-promoting-innovation#:%7E:text=Washingt%E2%80%A6, Jan. 16, 2019, 2 pages.
C. Dwork et al., "Differential Privacy and Robust Statistics," 41st ACM Symposium on Theory of Computing, 2009, 10 pages.
J. Camenisch et al., "Compact E-Cash," Eurocrypt, vol. 3494, 2005, pp. 302-321.
D. L. Chaum, "Untraceable Electronic Mail, Return Addresses, and Digital Pseudonyms," Communications of the ACM, vol. 24, No. 2, Feb. 1981, pp. 84-88.
J. Camenisch et al., "An Efficient System for Nontransferable Anonymous Credentials With Optional Anonymity Revocation," International Conference on the Theory and Application of Cryptographic Techniques, May 6-10, 2001, 30 pages.
M. K. Reiter et al., "Crowds: Anonymity for Web Transactions," ACM Transactions on Information and System Security, vol. 1, 1997, 23 pages.
I. Clarke et al., "Freenet: A Distributed Anonymous Information Storage and Retrieval System," International Workshop on Designing Privacy Enhanching Technologies: Design Issues in Anonymity and Unobservability, 2001, 21 pages.
P. Golle et al., "Universal Re-encryption for Mixnets," Lecture Notes in Computer Science, Feb. 2004, 15 pages.
Y. Lindell et al., "Multiparty Computation for Privacy Preserving Data Mining," Journal of Privacy and Confidentiality, May 6, 2008, 39 pages.
J. Hollan et al., "Distributed Cognition: Toward a New Foundation for Human-Computer Interaction Research," ACM Transactions on Computer-Human Interaction, vol. 7, No. 2, Jun. 2000, pp. 174-196.
A. Adams et al., "Users are Not the Enemy," Communications of the ACM, Dec. 1999, 6 pages.
A. Morton et al., "Privacy is a Process, Not a Pet: a Theory for Effective Privacy Practice," Proceedings of the 2012 New Security Paradigms Workshop, Sep. 2012, 18 pages.
G. D. Abowd et al., "Charting Past, Present and Future Research in Ubiquitous Computing," ACM Transactions on Computer-Human Interaction, vol. 7, No. 1, Mar. 2000, pp. 29-58.
W. Mason et al., "Conducting Behavioral Research on Amazon's Mechanical Turk," Behavior Research Methods, Jun. 2011, 23 pages.
G. M. Gray et al., "Dealing with the Dangers of Fear: The Role of Risk Communication," Health Affairs, Nov. 2002, 11 pages.
U.S. Appl. No. 17/005,949 filed in the name of Bjorn Markus Jakobsson et al. filed Aug. 28, 2020, and entitled "Privacy and the Management of Permissions.".
U.S. Appl. No. 17/032,759 filed in the name of Mark D. Telefus et al. filed Sep. 25, 2020, and entitled "AC-Driven Light-Emitting Diode Systems.".
U.S. Appl. No. 17/047,613 filed in the name of Mark Telefus et al. filed Oct. 14, 2020, and entitled "Intelligent Circuit Breakers.".
U.S. Appl. No. 62/963,230 filed in the name of Bjorn Markus Jakobsson filed Jan. 20, 2020, and entitled "Infrastructure Support to Enhance Resource-Constrained Device Capabilities.".
U.S. Appl. No. 62/964,078 filed in the name of Mark Telefus et al. filed Jan. 21, 2020, and entitled "Intelligent Power Receptacle with Arc Fault Circuit Interruption.".
U.S. Appl. No. 63/064,399 filed in the name of Mark Telefus et al. filed Aug. 11, 2020, and entitled "Energy Traffic Monitoring and Control System.".
U.S. Appl. No. 17/145,291 filed in the name of Mark Telefus et al. filed Jan. 9, 2021, and entitled "Building Automation System.".
U.S. Appl. No. 17/153,280 filed in the name of Bjorn Markus Jakobsson filed Jan. 20, 2021, and entitled "Infrastructure Support to Enhance Resource-Constrained Device Capabilities.".
U.S. Appl. No. 17/154,625 filed in the name of Mark Telefus et al. filed Jan. 21, 2021, and entitled "Intelligent Circuit Interruption.".
Extended European Search Report of EP19869963, dated Jul. 25, 2022, 9 pages.

* cited by examiner

SOLID-STATE POWER INTERRUPTERS

CROSS-REFERENCE TO RELATED APPLICATION

This application is a Continuation-in-Part of U.S. patent application Ser. No. 16/029,549, filed on Jul. 7, 2018, the disclosure of which is incorporated herein by reference.

TECHNICAL FIELD

This disclosure relates generally to power control systems and devices and, in particular, solid-state power interrupter devices and for disrupting power to loads.

BACKGROUND

Electrical power interrupters are an essential component in electrical distribution systems and are often positioned between an incoming high-current utility supply circuit and lower current branch circuits within a given building or home structure to protect branch circuit conductors and electrical loads from being exposed to over-current conditions. There are several types of over current conditions including overload conditions and fault conditions. An overload condition is defined as operation of equipment in excess of its normal, full-load rating, or a branch circuit in excess of its ampacity which, when the overload persists for a sufficient period of time, would cause damage or dangerous overheating. Fault conditions comprise unintended or accidental load conditions that typically produce much higher over-current conditions than do overloads, depending on the impedance of the fault. A fault producing the maximum over-current condition is referred to as a short-circuit or a "bolted fault."

Conventional power interrupters are electromechanical in nature and have electrical contacts that are physically separated by either manual intervention of an operator lever or automatically upon the occurrence of a fault condition or prolonged over current condition, in which cases the circuit interrupter is deemed to be "tripped." The separation of the electrical contacts of a circuit breaker can be performed electromagnetically or mechanically, or a combination of both. A significant problem with conventional circuit interrupters is that they are slow to react to fault conditions due to their electromechanical construction, and exhibit large variations in both the time to trip and the current trip limit in response to a fault or prolonged over-current conditions. Conventional power interrupters typically require at least several milliseconds to isolate a fault condition. The slow reaction time is undesirable since it raises the risk of hazardous fire, damage to electrical equipment, and arc-flashes, which can occur at the short-circuit location when a bolted fault is not isolated quickly enough.

SUMMARY

Embodiments of the disclosure include solid-state power interrupter devices and methods for interrupting power from a source to a load. For example, an exemplary embodiment includes a power interrupter device which comprises a solid-state bidirectional switch and control circuitry. The solid-state bidirectional switch is connected between an input terminal and an output terminal of the power interrupter device. The control circuitry configured to control the solid-state bidirectional switch. The control circuitry comprises driver circuitry and fault detection circuitry. The driver circuitry is configured to generate a regulated direct current (DC) voltage using current drawn from an input power source applied to the input terminal of the power interrupter device, and apply the regulated DC voltage to a control input of the solid-state bidirectional switch. The fault detection circuitry is configured to (i) sense a level of load current flowing in an electrical path between the input terminal and the output terminal of the power interrupter device, (ii) detect an occurrence of a fault condition based on the sensed load current level, and (iii) short the control input of the solid-state bidirectional switch to place the solid-state bidirectional switch in a switched-off state, in response to detecting the occurrence of a fault condition.

Other embodiments will be described in the following detailed description of embodiments, which is to be read in conjunction with the accompanying figures.

DETAILED DESCRIPTION OF EXEMPLARY EMBODIMENTS

Embodiments of the disclosure will now be described in further detail with regard to solid-state power interrupter devices and techniques for interrupting power from a source to a load based on, e.g., a detection of a fault condition (e.g., a short-circuit fault, an over-current fault, etc.) or in response to external control signals. It is to be understood that same or similar reference numbers are used throughout the drawings to denote the same or similar features, elements, or structures, and thus, a detailed explanation of the same or similar features, elements, or structures will not be repeated for each of the drawings. The term "exemplary" as used herein means "serving as an example, instance, or illustration". Any embodiment or design described herein as "exemplary" is not to be construed as preferred or advantageous over other embodiments or designs.

Figure 1:
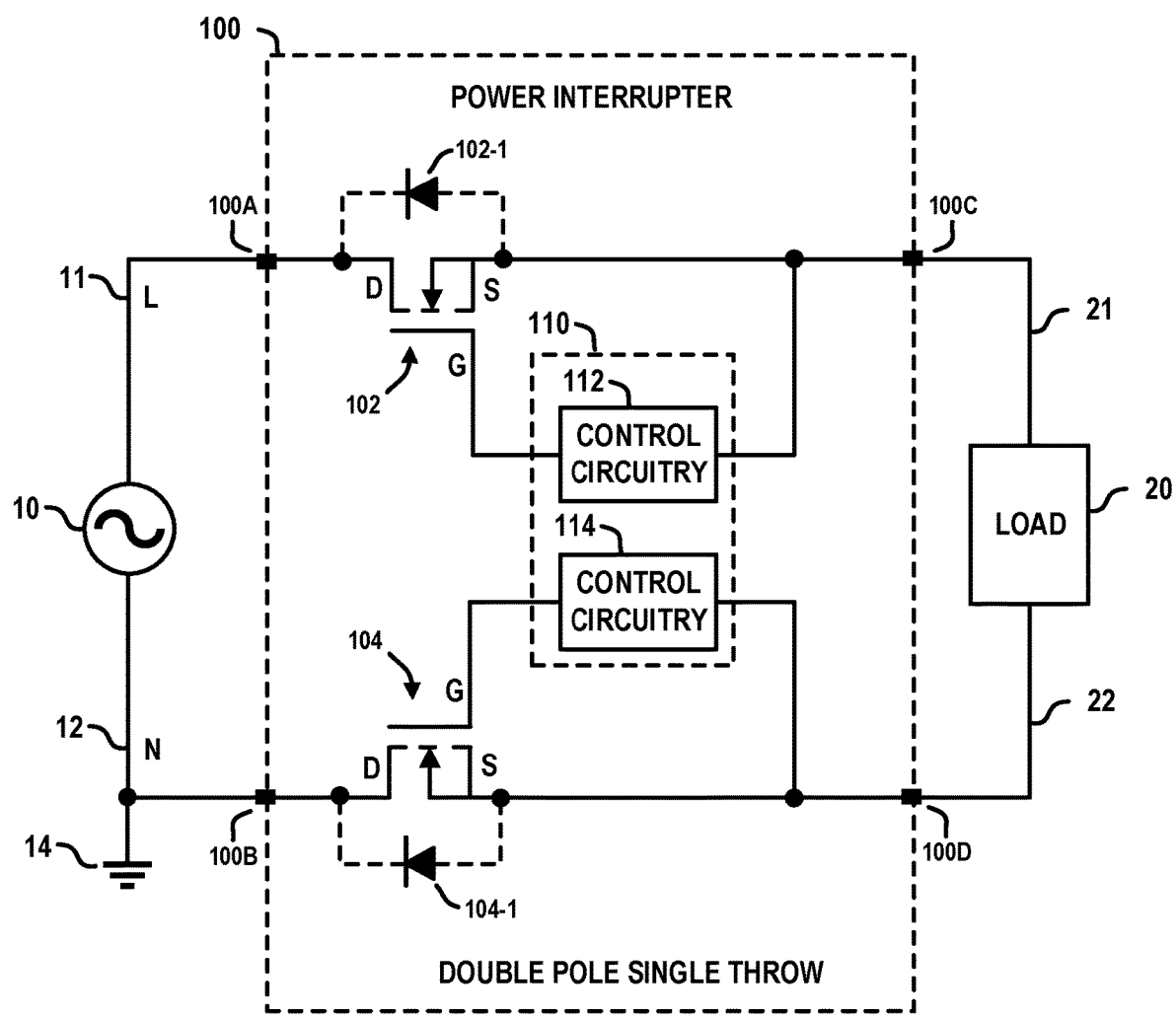
FIG. 1 schematically illustrates a solid-state power interrupter according to an exemplary embodiment of the disclosure.

FIG. 1 schematically illustrates a solid-state power interrupter according to an exemplary embodiment of the disclosure. In particular, FIG. 1 illustrates a solid-state power interrupter 100 connected between a utility power supply 10 (referred to herein as AC mains 10) and a load 20 which is connected to a branch circuit that is protected by the solid-state power interrupter 100. The solid-state power interrupter 100 has input terminals that are connected to a hot phase 11 (referred to as "line hot L") and a neutral phase 12 (referred to as "line neutral N") of the AC mains 10, and output terminals that are connected a load hot line 21 and a load neutral line 22 of the load 20. In particular, the solid-state power interrupter 100 comprises a line hot terminal 100A, a line neutral terminal 100B, a load hot terminal 100C, a load neutral terminal 100D (and optionally an earth ground terminal not shown). The line hot terminal 100A is coupled to the line hot 11 of the AC mains 10, the line neutral terminal 100B is coupled to the line neutral 12 of the AC mains 10, the load hot terminal 100C is coupled to the load hot line 21 of the load 20, and the load neutral terminal 100D is coupled to the neutral line 22 of the load 20. As further illustrated in FIG. 1, the line neutral 12 is shown bonded to earth ground 14 (GND), which provides added protection as is known in the art. The earth ground 14 is typically connected to a ground bar in a circuit breaker distribution panel, wherein the ground bar is bonded to a neutral bar in the circuit breaker distribution panel.

The solid-state power interrupter 100 comprises a double pole single throw (DPST) switch circuit which comprises a first solid-state switch 102, a second solid-state switch 104, and control circuitry 110 which comprises a first control circuit block 112, and a second control circuit block 114. In some embodiments, the first and second solid-state switches 102 and 104 comprise power MOSFET (metal-oxide semiconductor field-effect transistor) devices and, in particular, N-type enhancement MOSFET devices having gate terminals (G), drain terminals (D), and source terminals (S) as shown. The first and second solid-state switches 102 and 104 (alternatively MOSFET switches 102 and 104) comprise respective intrinsic body diodes 102-1 and 104-1, which represent P-N junctions between a P-type substrate body and N-doped drain regions of the MOSFET devices. In this regard, the body diodes 102-1 and 104-1 are intrinsic elements of the MOSFET switches 102 and 104 (i.e., not discrete elements). It is to be noted that the intrinsic body-to-source diodes of the first and second solid-state switches 102 and 104 are not shown as it is assumed that they are shorted out by connections between the source regions and the substrate bodies (e.g., N+ source and P body junction are shorted through source metallization).

The first solid-state switch 102 is serially connected in an electrical path (referred to as "hot line path") between the line hot terminal 100A and the load hot terminal 100C of the solid-state interrupter 100. The second solid-state switch 104 is serially connected in an electrical path (referred to as "neutral line path") between the line neutral terminal 100B and the load neutral terminal 100D of the solid-state interrupter 100. The first control circuit block 112 controls a gate-to-source voltage ($V_{GS}$) that is applied to the first solid-state switch 102 to control the activation and deactivation of the first solid-state switch 102. The second control circuit block 114 controls a gate-to-source voltage that is applied to the second solid-state switch 104 to control the activation and deactivation of the second solid-state switch 104. The first and second solid-state switches 102 and 104 collectively comprise a solid-state bidirectional switch that is configured to enable bidirectional current flow between the AC mains 10 and the load 20 (i.e., conduct positive current or negative current) when the first and second solid-state switches 102 and 104 are in a switched-on state, and block current flow between the AC mains 10 and the load 20 when the first and second solid-state switches 102 and 104 are in a switched-off state.

More specifically, in normal operation of the solid-state power interrupter 100, during a positive half cycle of an AC supply voltage waveform of the AC mains 10, a positive current flows in the hot line path through the first solid-state switch 102, through the load 20, and then in the neutral line path through the forward biased body diode 104-1, and back to the AC mains 10. On the other hand, during a negative half cycle of the AC supply voltage waveform of the AC mains 10, a negative current flows in the neutral line path through the second solid-state switch 104, through the load 20, and then in the hot line path through the forward biased body diode 102-1, and back to the AC mains 10. The exemplary configuration of simultaneously controlling AC switches on both the line and the neutral is referred to as double-pole switching and is applied to the two lines (hot and neural lines) of opposite phase from the single AC energy source.

The control circuitry 110 implements various functions for controlling the activation and deactivation of the first and second solid-state switches 102 and 104. For example, in some embodiments, the control circuitry 110 comprises self-biasing driver circuitry which is configured to utilize AC power from the AC mains 10 to generate regulated DC voltages to drive the gate terminals of the first and second solid-state switches 102 and 104. Further, in some embodiments, the control circuitry 110 comprises fault detection circuitry which is configured to sense an amount of load current flowing in the hot line path and/or the neutral line path through the solid-state interrupter 100, and detect an occurrence of a fault condition, such as short-circuit fault, an over-current fault, etc., based on the sensed current level. In response to detecting a fault condition, the fault detection circuitry is configured to short the control input (e.g., gate terminal) of at least one of the solid-state switches 102 and 104 to interrupt power to the load 20.

Furthermore, in some embodiments, the control circuitry 110 comprises a control switch to implement a forced turn-off control mode in which the solid-state power interrupter 100 is controlled by external control signals. For example, in some embodiments, the control circuitry 110 implements an optical switch which is configured to short the control inputs of the first and second solid-state switches 102 and 104 to place the first and second solid-state switches 102 and 104 in a switched-off state, in response to an optical control signal applied to the optical switch. In some embodiments, the control circuitry 110 implements a forced turn-off control mode in which the first and second solid-state switches 102 and 104 are turned-off in response to the detection of certain events including, but not limited to, detection of fault events, detection of hazardous environmental conditions, remote commands for circuit interruption, etc. As explained in further detail below, the forced turn-off control mode can be initiated on command by, e.g., direct hardware fault sensing and control, and/or through a galvanically isolated control input based on, but not limited to, optical, magnetic, capacitive, and RF isolation technologies.

Figure 2:
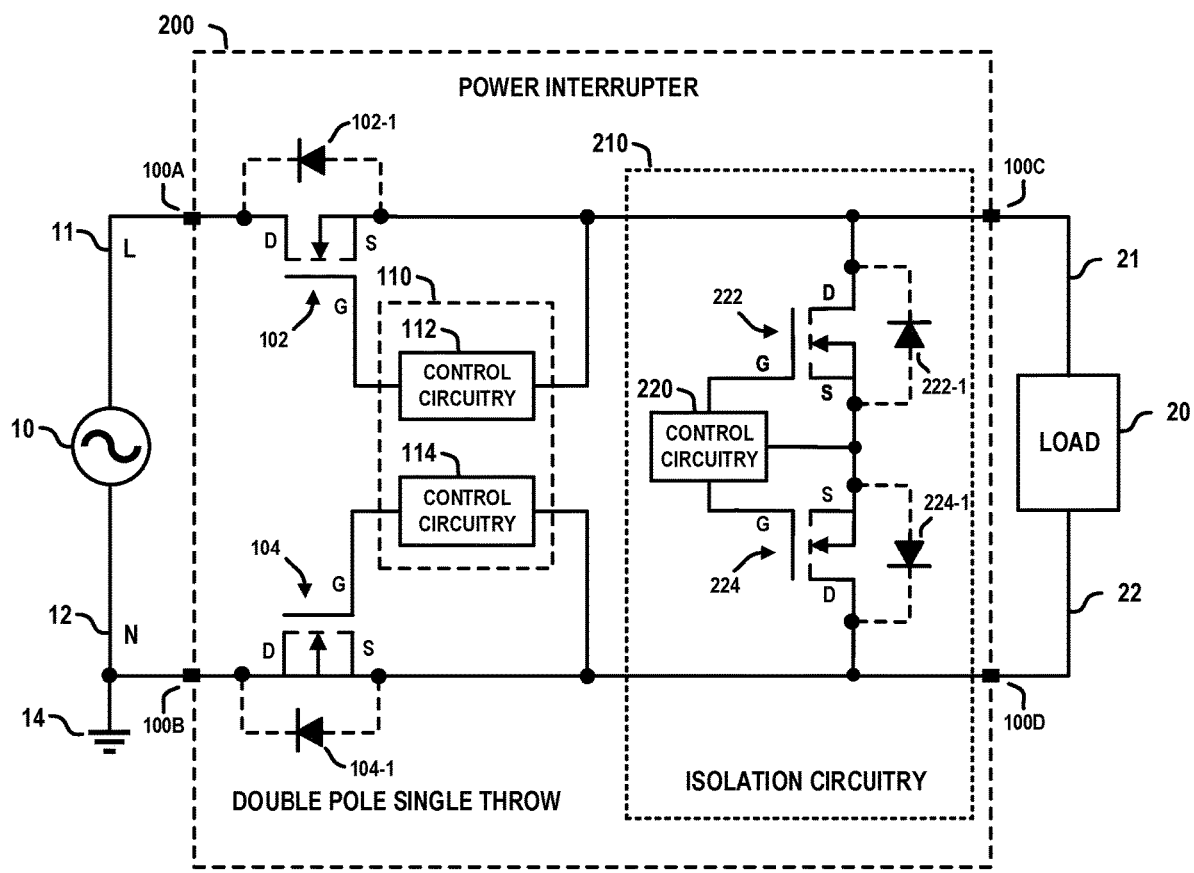
FIG. 2 schematically illustrates a solid-state power interrupter according to another exemplary embodiment of the disclosure.

FIG. 2 schematically illustrates a solid-state power interrupter according to another exemplary embodiment of the disclosure. In particular, FIG. 2 schematically illustrates a solid-state power interrupter 200 which is similar to the solid-state power interrupter 100 of FIG. 1, except that the solid-state power interrupter 200 further comprises isolation circuitry 210 to provide galvanic isolation between the solid-state power interrupter 200 and the load 20 when the first and second solid-state switches 102 and 104 are turned off. In some embodiments, the isolation circuitry 210 is connected across the load hot terminal 100C and the load neutral terminal 100D. The isolation circuitry 210 is configured to shunt the load 20 from unwanted leakage current flow from the AC mains 10 though the switched-off solid-state switches 102 and 104. When the first and second solid-state switches 102 and 104 are turned-off, the first and second solid-state switches 102 and 104 can generate a small amount of leakage current. For example, when the first and second solid-state switches 102 and 104 are in a switched-off state (e.g., cutoff mode), a small amount of leakage current (e.g., 200 uA) can flow through the first and second solid-state switches 102 and 104 and generate a sizable voltage drop across the load 20 when the load 20 comprises a high impedance load. In this regard, when activated, the isolation circuitry 210 provides a short circuit between the load hot terminal 100C and the load neutral terminal 100D to shunt the load 20 from any unwanted leakage current flow though the switched-off solid-state switches 102 and 104.

In some embodiments, the isolation circuitry 210 comprises a control circuit 220, a solid-state bidirectional switch comprising MOSFET switches 222 and 224 and associated body diodes 222-1 and 224-1. When the first and second solid-state switches 102 and 104 are turned off, the control circuit 220 generates gate control voltages to activate the MOSFET switches 222 and 224, and thereby create a short circuit path between the load hot terminal 100C and the load neutral terminal 100D, which allows any leakage current from the deactivated first and second solid-state switches 102 and 104 to flow through the isolation circuitry 210, and thereby shunt the unwanted leakage to prevent such leakage current from flowing into the load 20. The effect of bypassing or shunting leakage current away from the load 20 serves to isolate (e.g., galvanically isolate) the load 120 from the solid-state power interrupter 200 when the first and second switches 102 and 104 are in a switched-off state in a way that is equivalent to a galvanic isolation technique which implements an air-gap between the AC mains 10 and the load 20. In this configuration, the isolation circuitry 210 serves as a pseudo air-gap.

Figure 3:
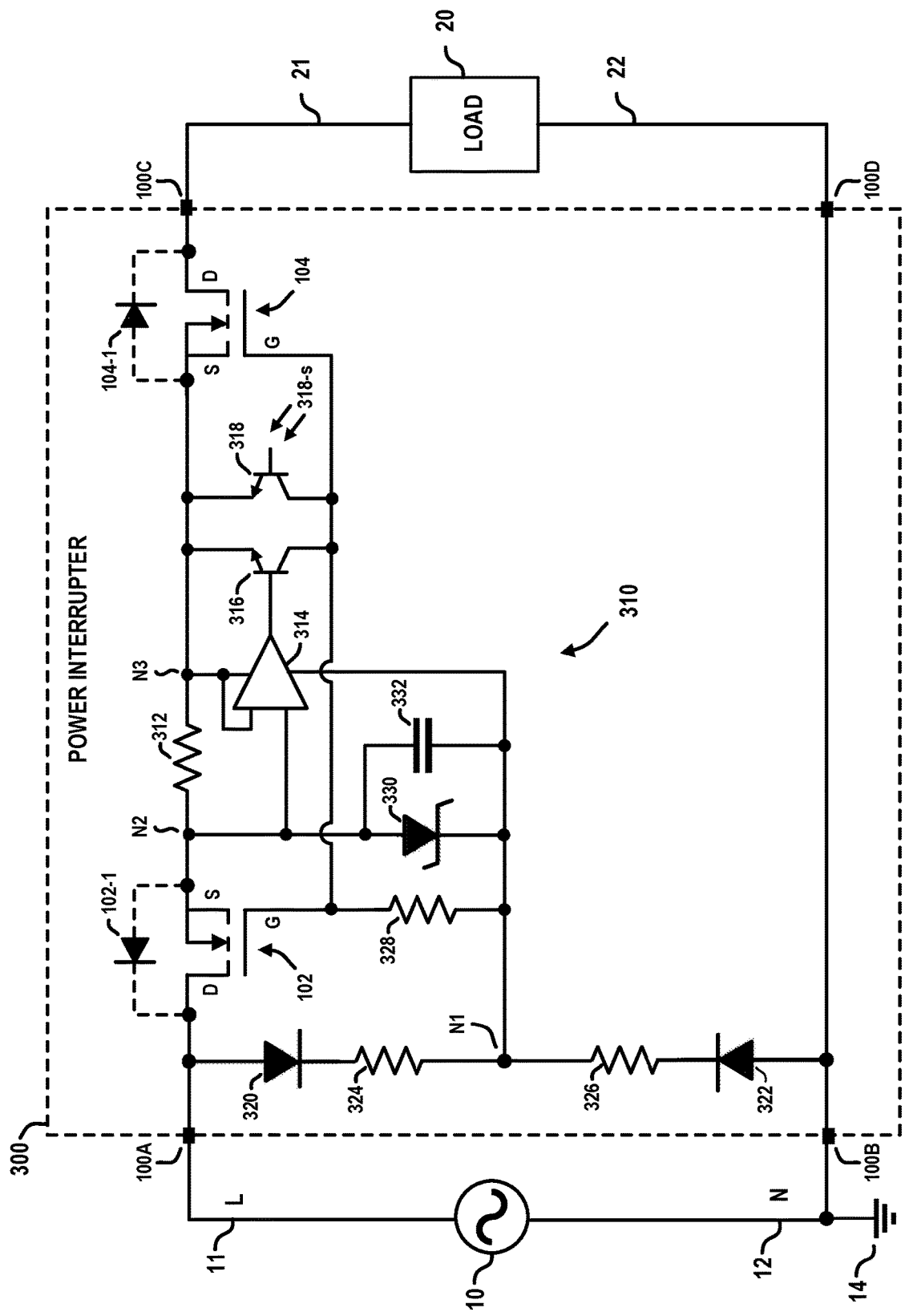
FIG. 3 schematically illustrates a solid-state power interrupter according to another exemplary embodiment of the disclosure.

FIG. 3 schematically illustrates a solid-state power interrupter according to another exemplary embodiment of the disclosure. In particular, FIG. 3 schematically illustrates a solid-state power interrupter 300 comprising a single pole single throw (SPST) switch framework in which the first solid-state switch 102 and the second solid-state switch 104 are serially connected in the hot line path between the line hot terminal 100A and the load hot terminal 100C, thereby providing a solid-state bidirectional switch disposed in the hot line path of the solid-state power interrupter 300. The solid-state power interrupter 300 further comprises control circuitry 310 to implement an exemplary embodiment of the control circuitry 110 and associated functions (e.g., self-biasing driver circuitry, fault detection circuitry, force-turn off control circuitry) as discussed above in conjunction with FIG. 1.

For example, as schematically illustrated in FIG. 3, the control circuitry 310 comprises a current sense resistor 312, an operational amplifier 314, a first control switch 316, a second control switch 318, a first diode 320, a second diode 322, a first resistor 324, a second resistor 326, a third resistor 328, a Zener diode 330, and a capacitor 332. In some embodiments, the first and second diodes 320 and 322, the resistors 324, 326, and 328, the Zener diode 330, and the capacitor 332 collectively implement self-biasing driver circuitry that is configured to utilize AC power from the AC mains 10 to generate a regulated DC voltage at an internal node N1 to drive the control inputs (e.g., gate terminals) of the first and second solid-state switches 102 and 104 and thereby activate the first and second solid-state switches 102 and 104.

As schematically illustrated in FIG. 3, the first diode 320 and the first resistor 324 are serially connected between the hot line path (e.g., the line hot terminal 100A node) and the internal node N1. In addition, the second diode 322 and the second resistor 326 are serially connected between the neutral line path (e.g., the line neutral terminal 100B node) and the internal node N1. In operation, during a negative half cycle of the AC supply voltage waveform of the AC mains 10, the second diode 322 is activated, and current flows from the line neutral 12 to the line hot 11 through the second diode 322, the second resistor 326, the capacitor 332, and the body diode 102-1 of the first solid-state switch 102. This current flow causes a voltage across the capacitor 332 to increase until the capacitor voltage reaches a clamping voltage (i.e., Zener voltage) of the Zener diode 330. In other words, the Zener voltage of the Zener diode 330 limits the maximum level of the self-bias turn-on threshold voltage ($V_{GS}$) which is generated on the internal node N1 to turn on the first and second solid-state switches 102 and 104.

In this exemplary embodiment, the voltage level on the internal node N1 is limited by the Zener voltage (i.e., reverse breakdown voltage) of the Zener diode 330 such that the Zener diode 330 serves as a solid-state clamp to limit the driving voltage on the internal node N1 to drive the control inputs (e.g., gate terminals) of the first and second solid-state switches 102 and 104. In this regard, the self-bias driving voltage is input-line voltage independent, as the level of the self-bias driving voltage is limited by the solid-state clamp. During a positive half cycle of AC supply voltage waveform of the AC mains 10, the first diode 320 is activated, and current flows from the line hot 11 to the line neutral 12 through the first diode 320, the first resistor 324, the capacitor 332, and the body diode 104-1 of the second solid-state switch 104. This current flow causes charge to trickle across the Zener diode 330 to maintain the regulated DC voltage (i.e., the Zener voltage) on the internal node N1 for driving the control terminal of the first and second solid-state switches 102 and 104.

Further, in some embodiments, the current sense resistor 312, the operational amplifier 314, and the first control switch 316 collectively comprise a fault detection circuit of the control circuitry 310. The fault detection circuit is configured to (i) sense an amount of load current flowing in the hot line path through the solid-state interrupter 300, (ii) detect an occurrence of a fault condition, such as short-circuit fault, an over-current fault, etc., based on the sensed current level, and (iii) in response to detecting the fault condition, shunt the control inputs (e.g., gate terminals) of the first and second solid-state switches 102 and 104 to thereby deactivate the first and second solid-state switches 102 and 104 and interrupt power to the load 20.

As schematically illustrated in FIG. 3, the sense resistor 312 is serially connected between the source terminals (S) (e.g., between nodes N2 and N3) of the first and second solid-state switches 102 and 104. The operational amplifier 314 comprises first and second input terminals (e.g., differential input terminals) which are connected to the nodes N2 and N3 across the sense resistor 312. The operational amplifier 314 comprises an output terminal that is connected to the first control switch 316. In some embodiments, the first control switch 316 comprises a bipolar junction transistor (BJT) device having a base terminal connected to the output terminal of the operational amplifier 314, an emitter terminal connected to the node N3, and a collector terminal connected to the gate terminals of the first and second solid-state switches 102 and 104.

During operation, the sense resistor 312 generates a burden voltage or sense voltage as a result of load current flowing in the hot line path through the sense resistor 312.

The sense voltage is applied to the differential inputs of the operational amplifier 314, and the operational amplifier 314 amplifies the sense voltage to generate an output voltage that is applied to the base terminal of the first control switch 316. When the output voltage of operational amplifier 314 is high enough (e.g., base-emitter voltage $V_{BE}$ is about 0.7 V), the first control switch 316 will turn on, which shunts the gate and source terminals of the first and second solid-state switches 102 and 104, and thereby causes the first and second solid-state switches 102 and 104 to turn off and interrupt power to the load 20.

In some embodiments, the sense resistor 312 has a very small resistance value such as on the order of 1 milliohm or less (e.g., 10× less than 1 milliohm). In this regard, the sense voltage across the sense resistors 312 is negligible in terms of causing minimal power dissipation, but yet sufficient for current sensing. The operational amplifier 314 is configured to have sufficient gain to be able to drive the first control switch 316, even with a relatively small voltage input corresponding to the voltage drop across the sense resistor 312. In this regard, the resistance value of the sense resistor 312 and the gain of the operational amplifier 314 are selected for a target load current limit (e.g., 100 amperes) to ensure that the output of the operational amplifier 314 generates a sufficient voltage to turn on the first control switch 316 when the magnitude of load current that flows through the sense resistor 312 reaches or exceeds the target current limit. In other words, the sense resistor 312 can have a relatively small resistance value (e.g., 1 milliohm) which generates a relatively small sense voltage and minimizes power dissipation for normal circuit operation, but which is amplified by the operational amplifier 314 to enable over-current detection using the small sense voltage. Moreover, the resistance value of the sense resistor 312 can remain fixed (e.g., 1 milliohm) while the gain of the operational amplifier 314 is adjusted as desired to adjust the target load current level for over-current and short circuit detection.

Furthermore, in some embodiments, the control circuitry 310 includes the second control switch 318 to implement a forced turn-off control circuit in which the solid-state power interrupter 300 is controlled by a control signal 318-$s$ (e.g., optical signal) which is generated by, e.g., an external control system or device. In particular, the second control switch 318 is activated in response to the control signal 318-$s$, wherein activation of the second control switch 318 serves to shunt the gate and source terminals of the first and second solid-state switches 102 and 104, which thereby causes the first and second solid-state switches 102 and 104 to turn off and interrupt power to the load 20.

In some embodiments, the second control switch 318 comprises a phototransistor (e.g., an optical BJT device which includes a photodiode junction) or other types of optically controlled switches which receive optical signals from complementary light emitting diodes (LED) that are controlled by, e.g., a sensor device or a microcontroller. The control signal 318-$s$ can be generated in response to remote commands (e.g., alarm signals) received from a local or a remote controller that is configured to detect fault conditions, or in response to remote commands received from an individual who can control operation of the solid-state power interrupter 300 through smart technologies implemented using, for example, an Internet-of-Things (IoT) wireless computing network, wherein the solid-state power interrupter 300 comprises a smart wireless IoT device.

In some embodiments, the control signal 318-$s$ is generated in response to the detection of hazardous environmental conditions by one or more sensors that are configured to sense environmental conditions. For example, such sensors can include one or more of (i) a chemical sensitive detector that is configured to detect the presence of hazardous chemicals, (ii) a gas sensitive detector that is configured to detect the presence of hazardous gases, (iii) a temperature sensor that is configured to detect high temperatures indicative of, e.g., a fire, (iv) a piezoelectric detector that is configured to detect large vibrations associated with, e.g., explosions, earthquakes, etc., (v) a humidity sensor or water sensor that is configured to detect floods or damp conditions, and other types of sensors that are configured to detect for the presence or occurrence of hazardous environmental conditions that would warrant power interruption to the load 20.

In some embodiments, the control signal 318-$s$ comprises ambient light that is sensed by the second control switch 318 which operates as a light sensor when implemented as a phototransistor. In this instance, the solid-state power interrupter 300 can be a component of an electrical light switch device such that when the intensity of the ambient light (e.g., intensity of the optical signal 318-3) reaches a certain level, the second control switch 318 is activated to turn off the first and second solid-state switches 102 and 104 an interrupt power that is delivered to a lighting element.

The optical coupling between second control switch 318 and the external control system which control the generation of the control signal 318-$s$ essentially provides galvanic isolation between the solid-state power interrupter 300 and the external control system. In other embodiments, galvanic isolation can be implemented using magnetic, capacitive, or radio frequency (RF) isolation technologies.

Figure 4:
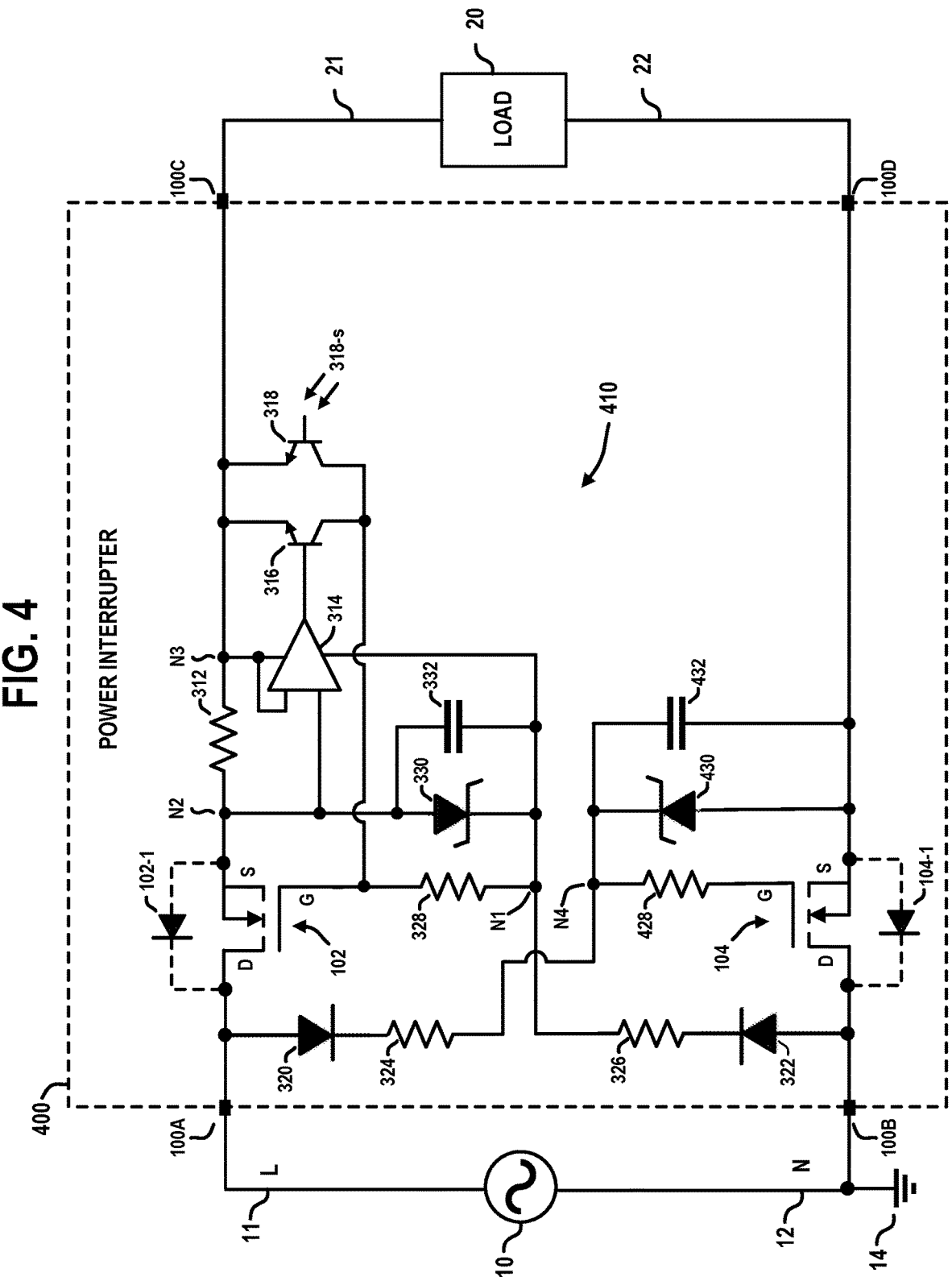
FIG. 4 schematically illustrates a solid-state power interrupter according to another exemplary embodiment of the disclosure.

FIG. 4 schematically illustrates a solid-state power interrupter according to another exemplary embodiment of the disclosure. In particular, FIG. 4 schematically illustrates a solid-state power interrupter 400 which is similar to the solid-state power interrupter 300 of FIG. 3, except the solid-state power interrupter 400 comprises the second solid-state switch 104 serially connected in the neutral line path between the line neutral terminal 100B and the load neutral terminal 100D of the solid-state interrupter 400 (similar to the exemplary embodiment of FIG. 1). In addition, the solid-state power interrupter 400 comprises control circuitry 410 which is similar to the control circuitry 310 of the solid-state power interrupter 300 of FIG. 3, except that the control circuitry 410 further comprises an additional resistor 428, Zener diode 430, and capacitor 432 to implement a separate self-biasing driver circuit that is configured to utilize AC power from the AC mains 10 to generate a regulated DC voltage (e.g., turn-on threshold voltage) at an internal node N4 to drive the gate terminal of second solid-state switch 104.

Similar to the operation of the control circuitry 310 of FIG. 3, during a negative half cycle of the AC supply voltage waveform of the AC mains 10, the second diode 322 is activated, and current flows from the line neutral 12 to the line hot 11 through the second diode 322, the second resistor 326, the capacitor 332, and the body diode 102-1 of the first solid-state switch 102. This current flow causes a voltage across the capacitor 332 to increase until the capacitor voltage reaches the Zener voltage of the Zener diode 330, whereby the Zener diode 330 serves as a solid-state clamp to limit the level of the regulated DC voltage that is maintained on the internal node N1 to drive the first solid-state switch 102.

On the other hand, during a positive half cycle of AC supply voltage waveform of the AC mains 10, the first diode 320 is activated, and current flows from the line hot 11 to the line neutral 12 through the first diode 320, the first resistor 324, the capacitor 432, and the body diode 104-1 of the second solid-state switch 104. This current flow causes a voltage across the capacitor 432 to increase until the capacitor voltage reaches the Zener voltage of the Zener diode 430, whereby the Zener diode 430 serves as a solid-state clamp to limit the level of the regulated DC voltage that is maintained on the internal node N4 to drive the second solid-state switch 104.

Furthermore, while not specifically shown in FIG. 4, a second fault detection circuit block and a second forced turn-off control circuit block (which comprise the same components, circuit connections, and functionalities as the current sense resistor 312, the operational amplifier 314, and the first and second control switches 316 and 318) can be implemented on the neutral line path to provide a separate fault detection block for sensing load current flowing on the neutral line path, and to implement a forced turn-off control of the second solid-state switch 104, using the same techniques as discussed above in conjunction with FIG. 3.

Figure 5:
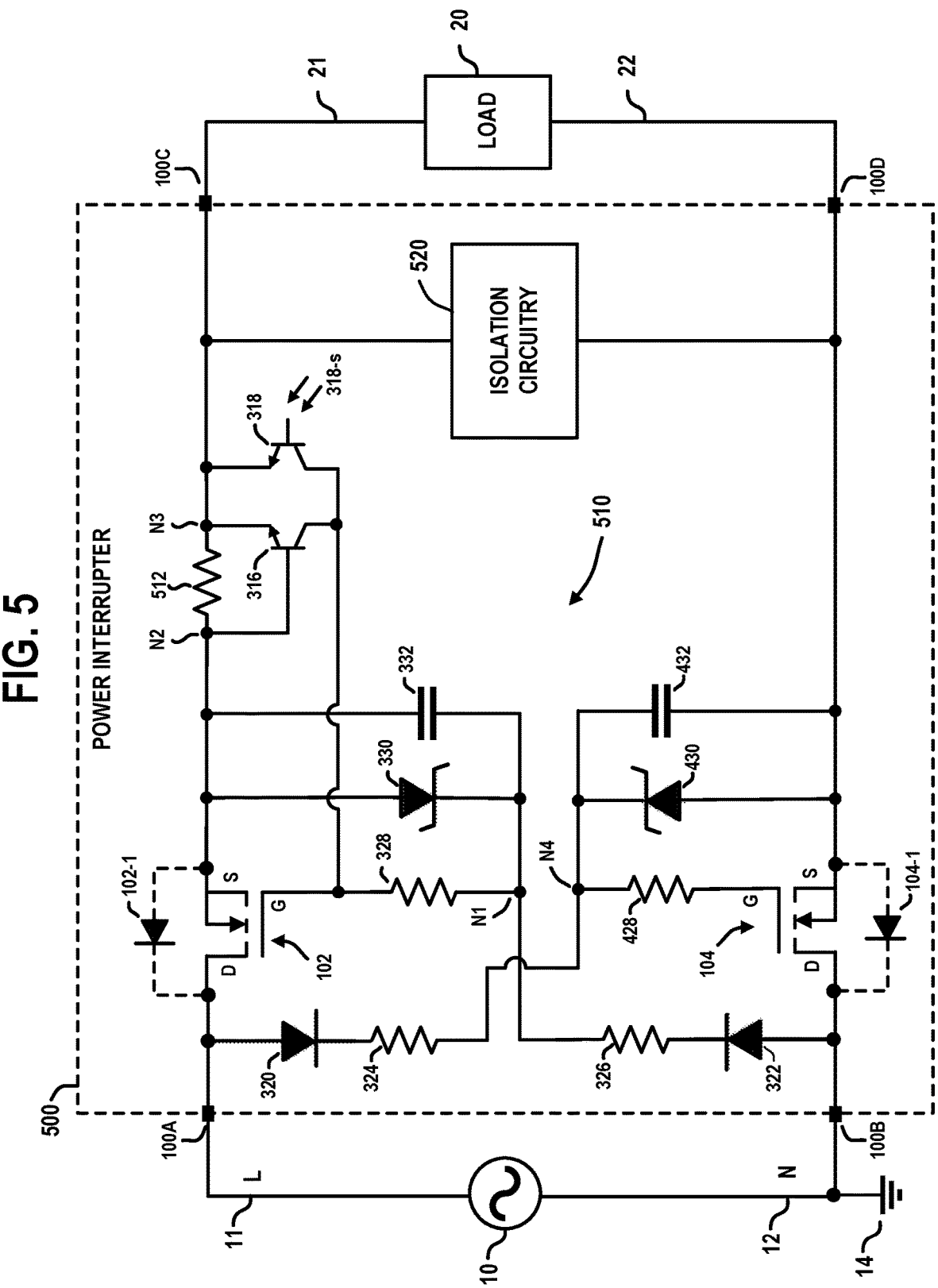
FIG. 5 schematically illustrates a solid-state power interrupter according to another exemplary embodiment of the disclosure.

FIG. 5 schematically illustrates a solid-state power interrupter according to another exemplary embodiment of the disclosure. In particular, FIG. 5 schematically illustrates a solid-state power interrupter 500 which is similar to the solid-state power interrupter 400 of FIG. 4, except that the solid-state power interrupter 500 implements a different circuit configuration of the fault detection circuitry. In particular, as schematically illustrated in FIG. 5, the fault detection circuitry comprises a current sense resistor 512 and the first control switch 316, which are configured to (i) sense an amount of load current flowing in the hot line path through the solid-state interrupter 100, (ii) detect an occurrence of a fault condition, such as short-circuit fault, an over-current fault, etc., based on the sensed current level, and (iii) in response to detecting a fault condition, shunt the control input of the first solid-state switch 102 to thereby deactivate the first solid-state switch 102 and interrupt power to the load 20.

As schematically illustrated in FIG. 5, the sense resistor 512 is connected between nodes N2 and N3. In addition, the base terminal of the first control switch 316 (BJT device) is connected to the node N2, and the emitter terminal of the first control switch 316 is connected to the node N3. In this configuration, during operation, the sense resistor 512 generates a burden voltage or sense voltage as a result of load current flowing in the hot line path through the sense resistor 512. When the sense voltage is high enough (e.g., base-emitter voltage VBE is about 0.7 V), the first control switch 316 will turn on, which shunts the gate and source terminal of the first solid-state switch 102, and thereby causes the first solid-state switch 102 to turn off and interrupt power to the load 20.

In some embodiments, the sense resistor 512 has a resistance value that is selected for a target load current limit (e.g., 100 amperes) to ensure that the first control switch 316 is activated when the magnitude of the load current that flows through the sense resistor 512 reaches or exceeds the target load current limit. For example, assuming that the first control switch 316 is activated when the base-emitter voltage $V_{BE}$ reaches 0.7 V, and assuming that the load current limit is selected to be 100 amperes, the sense resistor would have a resistance of 0.007 ohms (i.e., V=IR, where 0.7 V=100 A×0.007 ohms).

Furthermore, while not specifically shown in FIG. 5, a second fault detection circuit block and a second forced turn-off control circuit block (which comprise the same components, circuit connections, and functionalities as the current sense resistor 512, and the first and second control switches 316 and 318) can be implemented on the neutral line path to provide a separate fault detection block for sensing load current flowing on the neutral line path, and to implement a forced turn-off control of the second solid-state switch 104, using the same techniques as discussed above.

As further shown in FIG. 5, the solid-state power interrupter 500 further comprises isolation circuitry 520, which is connected across the load hot terminal 100C and the load neutral terminal 100D, to provide galvanic isolation between the solid-state power interrupter 500 and the load 20 when the solid-state switches 102 and 104 are turned off. In some embodiments, the isolation circuitry 520 implements the isolation circuitry 210 shown in FIG. 2. It is to be understood that the isolation circuitry 210 of FIG. 2 can be implemented in the exemplary embodiments of the solid-state power interrupters 300 and 400 shown in FIGS. 3 and 4.

Figure 6:
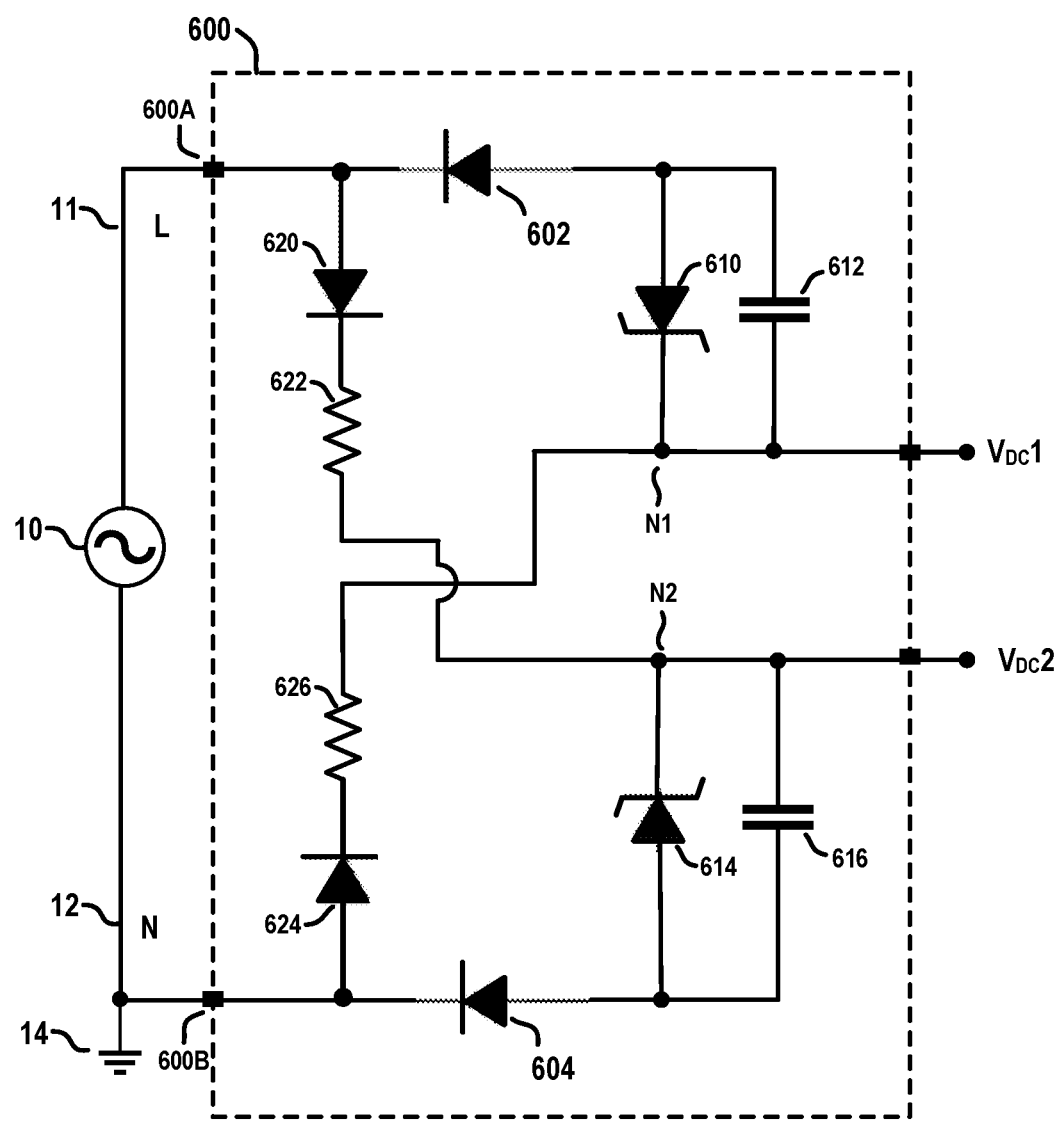
FIG. 6 schematically illustrates an AC-to-DC converter and regulator circuit according to an embodiment of the disclosure.

FIG. 6 schematically illustrates an AC-to-DC converter and regulator circuit according to an embodiment of the disclosure. In particular, FIG. 6 schematically illustrates an AC-to-DC converter and regulator circuit 600 which has a circuit framework that is based on the self-biasing driver circuitry of the solid-state power interrupter 500 of FIG. 5. The AC-to-DC converter and regulator circuit 600 is configured to utilize AC power from the AC mains 10 to generate two regulated DC voltages $V_{DC}1$ and $V_{DC}2$ at nodes N1 and N2, respectively. In FIG. 5, the regulated DC voltages $V_{DC}1$ and $V_{DC}2$ are utilized to drive the gate terminals of the respective first and second solid-state switches 102 and 104. However, the AC-to-DC converter and regulator circuit 600 can be implemented in other applications to generate regulated DC voltages from AC power.

As shown in FIG. 6, the AC-to-DC converter and regulator circuit 600 comprises discrete diodes 602 and 604, which correspond to the parasitic body diodes 102-1 and 104-1, respectively, in FIG. 5. The AC-to-DC converter and regulator circuit 600 further comprises a first clamping circuit block comprising a first Zener diode 610 and a first capacitor 612 connected to the first node N1, and a second clamping circuit block comprising a second Zener diode 614 and a second capacitor 616 connected to the second node N2. The AC-to-DC converter and regulator circuit 600 further comprises a diode 620 and resistor 622 serially connected between an AC line input terminal 600A and the second node N2, and a diode 624 and resistor 626 serially connected between an AC neutral line input terminal 600B and the first node N1.

During a negative half cycle of an AC supply voltage waveform of the AC mains 10, the diodes 624 and 602 are activated, and current flows from the line neutral 12 to the line hot 11 through the diode 624, the resistor 626, the first capacitor 612, and the diode 602. This current flow causes a voltage across the first capacitor 612 to increase until the capacitor voltage reaches a Zener voltage of the first Zener diode 610. In this regard, the first Zener diode 610 serves as a solid-state clamp to limit the level of the regulated DC voltage $V_{DC}1$ that is maintained on the first node N1. On the other hand, during a positive half cycle of AC supply voltage waveform of the AC mains 10, the diodes 620 and 604 are activated, and current flows from the line hot 11 to the line neutral 12 through the diode 620, the resistor 622, the second capacitor 616, and the diode 604. This current flow causes a voltage across the second capacitor 616 to increase until the capacitor voltage reaches the Zener voltage of the second Zener diode 614. In this regard, the second Zener diode 614 serves as a solid-state clamp to limit the level of the regulated DC voltage $V_{DC}2$ that is maintained on the second node N2.

Exemplary embodiments of the disclosure as shown in FIGS. 1, 2, 3, 4, and 5 include novel architectures for solid-state power interrupter devices that can be disposed between an input energy source and an output load. While the exemplary solid-state power interrupters are generically depicted as connecting the AC mains 10 to a load 20, it is to be understood that the exemplary power interrupters can be embodied in various devices and applications. For example, in some embodiments, the power interrupters shown in FIGS. 1-5 can be implemented in an electrical circuit breaker device (e.g., intelligent circuit breaker device), which is disposed in a circuit breaker distribution panel. In addition, in some embodiments, the power interrupters shown in FIGS. 1-5 can be implemented in an electrical receptacle device, or an electrical light switch (e.g., a wall-mounted light switch or a light switch implemented in a smart light fixture or smart ceiling light bulb socket, etc.). In other embodiments, the power interrupters shown in FIGS. 1-5 may comprise standalone devices that can be disposed within a gang box in an electrical network of a home or building and configured to protect one or more electrical devices, appliances, loads, etc., that are connected in a branch circuit downstream of the standalone power interrupter device.

Although exemplary embodiments have been described herein with reference to the accompanying figures, it is to be understood that the invention is not limited to those precise embodiments, and that various other changes and modifications may be made therein by one skilled in the art without departing from the scope of the appended claims.

What is claimed is:

1. A power interrupter device, comprising:
   a solid-state bidirectional switch connected between a first input terminal and an output terminal of the power interrupter device, wherein the first input terminal and a second input terminal of the power interrupter device are configured to couple to an alternating current (AC) power source; and
   control circuitry configured to control the solid-state bidirectional switch, wherein the control circuitry comprises:
      driver circuitry configured to generate a regulated direct current (DC) voltage using current drawn from positive and negative half-cycles of the AC power source when the AC power source is coupled to the first and second input terminals of the power interrupter device, and apply the regulated DC voltage to a control input of the solid-state bidirectional switch to place the solid-state bidirectional switch in an on state; and
      fault detection circuitry configured to (i) sense a level of current flowing in an electrical path between the first input terminal and the output terminal of the power interrupter device, (ii) detect an occurrence of a fault condition based on the sensed current level, and (iii) couple the control input to a second terminal of the solid-state bidirectional switch to place the solid-state bidirectional switch in an off state, in response to detecting the occurrence of the fault condition;
   wherein the driver circuitry comprises:
      a voltage clamping circuit comprising a capacitor and a Zener diode connected in parallel between a first node and a second node, wherein the first node is coupled to the control input of the solid-state bidirectional switch and the second node is coupled to the second terminal of the solid-state bidirectional switch, wherein the regulated DC voltage comprises a Zener voltage of the Zener diode;
      a first branch circuit coupling the first input terminal of the power interrupter device to the first node and configured to apply current to the voltage clamping circuit during positive half-cycles of the AC power source; and
      a second branch circuit coupling the second input terminal of the power interrupter device to the first node and configured to apply current to the voltage clamping circuit during negative half-cycles of the AC power source.

2. The power interrupter device of claim 1, wherein:
   the first branch circuit comprises a first diode and a first resistor connected in series between the first input terminal of the power interrupter device and the first node; and
   the second branch circuit comprises a second diode and a second resistor connected in series between the second input terminal of the power interrupter device and the first node.

3. The power interrupter device of claim 1, wherein the fault detection circuitry comprises:
   a current sense resistor serially connected between the second node and a third node in the electrical path between the first input terminal and the output terminal of the power interrupter device;
   an operational amplifier comprising differential input terminals connected to the second and third nodes across the current sense resistor; and
   a first control switch having a control input connected to an output of the operational amplifier.

4. The power interrupter device of claim 3, wherein the current sense resistor comprises a resistance that is no greater than about one milliohm.

5. The power interrupter device of claim 3, wherein the first control switch comprises a bipolar junction transistor (BJT) device having a base terminal connected to the output terminal of the operational amplifier, an emitter terminal connected to the third node in the electrical path between the first input terminal and the output terminal of the power interrupter device, and a collector terminal connected to the control input of the solid-state bidirectional switch.

6. The power interrupter device of claim 1, wherein the fault detection circuitry comprises:
   a current sense resistor serially connected between the second node and a third node in the electrical path between the first input terminal and the output terminal of the power interrupter device; and
   a first control switch having a first terminal connected the second node in the electrical path, a second terminal connected to the third node in the electrical path, and a third terminal connected to connected to the control input of the solid-state bidirectional switch.

7. The power interrupter device of claim 6, wherein the first control switch comprises a bipolar junction transistor (BJT) device having a base terminal connected to the second node, an emitter terminal connected to the third node, and a collector terminal connected to the control input of the solid-state bidirectional switch.

8. The power interrupter device of claim 1, wherein the control circuitry further comprises a forced turn-off control circuit configured to (i) receive an external control signal and (ii) couple the control input to the second terminal of the solid-state bidirectional switch to place the solid-state bidirectional switch in the off state, in response to the external control signal.

9. The power interrupter device of claim 8, wherein the forced turn-off control circuit comprises a second control switch having a first control terminal configured to receive the external control signal, a second terminal connected to a third node in the electrical path between the first input terminal and the output terminal of the power interrupter device, and a third terminal connected to the control input of the solid-state bidirectional switch.

10. The power interrupter device of claim 9, wherein the second control switch comprises a phototransistor device having a base terminal configured to receive an optical control signal, an emitter terminal connected to the third node in the electrical path, and a collector terminal connected to the control input of the solid-state bidirectional switch.

11. The power interrupter device of claim 1, further comprising an isolation circuit which is configured to shunt leakage current from a load circuit connected to the power interrupter device, when the solid-state bidirectional switch is in the off state.

12. The power interrupter device of claim 1, wherein:
the solid-state bidirectional switch comprises a first metal-oxide-semiconductor field-effect transistor (MOSFET) switch and a second MOSFET switch;
the control input of the solid-state bidirectional switch comprises commonly connected gate terminals of the first and second MOSFET switches; and
the second terminal of the solid-state bidirectional switch comprises source terminals of the first and second MOSFET switches.

13. The power interrupter device of claim 12, wherein the solid-state bidirectional switch is implemented in a single pole single throw configuration wherein the first MOSFET switch and the second MOSFET switch are serially connected in the electrical path between the first input terminal and the output terminal of the power interrupter device.

14. A method comprising:
controlling a solid-state bidirectional switch, which is connected between a first input terminal and an output terminal of a power interrupter device, to place the solid-state bidirectional switch in one of (i) an on state to provide an electrical connection in an electrical path between the first input terminal and the output terminal, and (ii) an off state;
wherein controlling the solid-state bidirectional switch comprises:
generating a regulated direct current (DC) voltage using current drawn from positive and negative half-cycles of an alternating current (AC) power source when the AC power source is coupled to the first input terminal and a second input terminal of the power interrupter device, and applying the regulated DC voltage to a control input of the solid-state bidirectional switch to place the solid-state bidirectional switch in the on state; and
detecting for a fault condition by (i) sensing a level of current flowing in the electrical path between the first input terminal and the output terminal of the power interrupter device, (iii) detecting an occurrence of the fault condition based on the sensed current level, and (iii) coupling the control input to a second terminal of the solid-state bidirectional switch to place the solid-state bidirectional switch in the off state, in response to detecting the occurrence of the fault condition;
wherein generating the regulated DC voltage comprises applying current drawn from the positive and negative half-cycles of the AC power source to a voltage clamping circuit which comprises a capacitor and a Zener diode connected in parallel between a first node and a second node, to charge the capacitor to a Zener voltage of a Zener diode, wherein the regulated DC voltage comprises the Zener voltage of the Zener diode, and wherein the first node is coupled to the control input of the solid-state bidirectional switch and the second node is coupled to the second terminal of the solid-state bidirectional switch; and
wherein applying the current drawn from the positive and negative half-cycles of the AC power source to the voltage clamping circuit comprises:
utilizing a first branch circuit to couple the first input terminal of the power interrupter device to the first node and apply current to the voltage clamping circuit during positive half-cycles of the AC power source; and
utilizing a second branch circuit to couple the second input terminal of the power interrupter device to the first node and apply current to the voltage clamping circuit during negative half-cycles of the AC power source.

15. The method of claim 14, wherein:
the first branch circuit comprises a first diode and a first resistor connected in series between the first input terminal of the power interrupter device and the first node; and
the second branch circuit comprises a second diode and a second resistor connected in series between the second input terminal of the power interrupter device and the first node.

16. The method of claim 14, wherein:
sensing the level of current flowing in the electrical path between the first input terminal and the output terminal of the power interrupter device comprises sensing a voltage that is generated by a current sense resistor in response to the current flowing in the electrical path through the current sense resistor; and
detecting for the occurrence of the fault condition based on the sensed current level, and coupling the control input to the second terminal of the solid-state bidirectional switch to place the solid-state bidirectional switch in the off state, in response detecting the occurrence of the fault condition comprises:
amplifying the sensed voltage to generate an amplified voltage;
applying the amplified voltage to a control input of a first control switch; and
activating the first control switch in response to the amplified voltage, wherein activation of the first control switch causes the coupling of the control input to the second terminal of the solid-state bidirectional switch.

17. The method of claim 14, further comprising:
applying an optical control signal to activate an optical switch of the power interrupter device; and
coupling the control input to the second terminal of the solid-state bidirectional switch to place the solid-state bidirectional switch in the off state, in response the activation of the optical switch.

18. A power interrupter device, comprising:
a solid-state bidirectional switch connected between a first input terminal and an output terminal of the power interrupter device, wherein the first input terminal and a second input terminal of the power interrupter device are configured to couple to an alternating current (AC) power source;
driver circuitry configured to generate a regulated direct current (DC) voltage using current drawn from positive and negative half-cycles of the AC power source when the AC power source is coupled to the first and second input terminals of the power interrupter device, and apply the regulated DC voltage to a control input of the solid-state bidirectional switch to place the solid-state bidirectional switch in an on state; and
fault detection circuitry configured to detect an occurrence of a fault condition and place the solid-state bidirectional switch in an off state, in response to detecting the occurrence of the fault condition;
wherein the driver circuitry comprises:
a voltage clamping circuit comprising a capacitor and a Zener diode connected in parallel between a first node and a second node, wherein the first node is coupled to the control input of the solid-state bidirectional switch and the second node is coupled to a second terminal of the solid-state bidirectional switch, wherein the regulated DC voltage comprises a Zener voltage of the Zener diode;
a first branch circuit coupling the first input terminal of the power interrupter device to the first node and configured to apply current to the voltage clamping circuit during positive half-cycles of the AC power source; and
a second branch circuit coupling the second input terminal of the power interrupter device to the first node and configured to apply current to the voltage clamping circuit during negative half-cycles of the AC power source.

19. The power interrupter device of claim 18, wherein:
the first branch circuit comprises a first diode and a first resistor connected in series between the first input terminal of the power interrupter device and the first node; and
the second branch circuit comprises a second diode and a second resistor connected in series between the second input terminal of the power interrupter device and the first node.

20. The power interrupter device of claim 18, wherein the fault detection circuitry comprises:
a current sense resistor serially connected between the second node and a third node in an electrical path between the first input terminal and the output terminal of the power interrupter device; and
control circuitry configured to (i) sense a level of current flowing through the current sense resistor, (ii) detect an occurrence of a fault condition based on the sensed level of current flowing through the current sense resistor, and (iii) place the solid-state bidirectional switch in the off state, in response to detecting the occurrence of the fault condition based on the sensed level of current flowing through the current sense resistor.

* * * * *